(12) United States Patent
Kennedy et al.

(10) Patent No.: US 8,688,651 B2
(45) Date of Patent: Apr. 1, 2014

(54) DYNAMIC DEDUPLICATION

(75) Inventors: Jon Christopher Kennedy, Marlborough, MA (US); Ronald Ray Trimble, Acton, MA (US)

(73) Assignee: Sepaton, Inc., Marlborough, MA (US)

( * ) Notice: Subject to any disclaimer, the term of this patent is extended or adjusted under 35 U.S.C. 154(b) by 0 days.

(21) Appl. No.: 13/013,409

(22) Filed: Jan. 25, 2011

(65) Prior Publication Data

US 2012/0191670 A1    Jul. 26, 2012

(51) Int. Cl.
*G06F 17/00*    (2006.01)

(52) U.S. Cl.
USPC ............ 707/692; 707/736; 707/758; 715/234

(58) Field of Classification Search
None
See application file for complete search history.

(56) References Cited

U.S. PATENT DOCUMENTS

| | | | |
|---|---|---|---|
| 5,276,860 A | 1/1994 | Fortier et al. |
| 5,403,639 A | 4/1995 | Belsan et al. |
| 5,990,810 A | 11/1999 | Williams |
| 6,101,472 A | 8/2000 | Giangarra et al. |
| 6,366,986 B1 | 4/2002 | St. Pierre et al. |
| 6,385,706 B1 | 5/2002 | Ofek et al. |
| 6,477,544 B1 | 11/2002 | Bolosky et al. |
| 6,542,906 B2 | 4/2003 | Korn |
| 6,704,730 B2 | 3/2004 | Moulton et al. |
| 6,714,952 B2 | 3/2004 | Dunham et al. |
| 6,779,095 B2 | 8/2004 | Selkirk et al. |
| 6,795,819 B2 | 9/2004 | Wheeler et al. |
| 6,889,297 B2 | 5/2005 | Krapp et al. |
| 7,024,427 B2 | 4/2006 | Bobbitt et al. |
| 7,055,008 B2 | 5/2006 | Niles et al. |
| 7,065,619 B1 | 6/2006 | Zhu et al. |
| 7,116,249 B2 | 10/2006 | McCanne et al. |
| 7,146,476 B2 | 12/2006 | Sandorfi et al. |
| 7,155,585 B2 | 12/2006 | Lam et al. |
| 7,181,373 B2 | 2/2007 | Le Cocq et al. |
| 7,251,680 B2 | 7/2007 | DeVos |
| 7,373,603 B1 | 5/2008 | Yalovsky et al. |
| 7,430,647 B2 | 9/2008 | Sandorfi et al. |
| 7,457,934 B2 | 11/2008 | Yagawa |
| 7,472,242 B1 | 12/2008 | Deshmukh et al. |

(Continued)

FOREIGN PATENT DOCUMENTS

| | | |
|---|---|---|
| EP | 0774715 A1 | 5/1997 |
| KR | 1020060073724 | 6/2006 |
| WO | 2005017686 A2 | 2/2005 |
| WO | 2005033945 A1 | 4/2005 |

OTHER PUBLICATIONS

Bhagwat et al, "Extreme Binning: Scalable, Parallel Deduplication for Chunk-based File Backup", 2009.*

(Continued)

*Primary Examiner* — Hung Le
(74) *Attorney, Agent, or Firm* — Lando & Anastasi, LLP (57) ABSTRACT

Described are computer-based methods and apparatuses, including computer program products, for dynamic deduplication. Data is processed using an algorithm that deduplicates the data based on a first set of parameters. A first moving average of a first deduplication performance metric is calculated for the algorithm over a time period. A second moving average of a second deduplication performance metric is calculated for the algorithm over the time period. It is determined that the first moving average satisfies a first criterion, the second moving average satisfies a second criterion, or both. The algorithm is reconfigured based on a second set of parameters to deduplicate data.

20 Claims, 7 Drawing Sheets

(56) References Cited

U.S. PATENT DOCUMENTS

| | | | |
|---|---|---|---|
| 7,552,358 B1 | 6/2009 | Asgar-Deen et al. | |
| 7,555,755 B2 | 6/2009 | Fairweather | |
| 7,590,808 B2 | 9/2009 | Lam et al. | |
| 7,822,725 B2 | 10/2010 | Walliser et al. | |
| 7,962,499 B2 | 6/2011 | Lam | |
| 8,121,993 B2 | 2/2012 | Blount et al. | |
| 8,140,821 B1 | 3/2012 | Raizen et al. | |
| 8,156,306 B1 | 4/2012 | Raizen et al. | |
| 8,271,313 B2 | 9/2012 | Williams et al. | |
| 8,280,926 B2 | 10/2012 | Sandorfi et al. | |
| 8,285,690 B2 * | 10/2012 | Nakamura et al. | 707/692 |
| 8,320,578 B2 | 11/2012 | Kahn et al. | |
| 8,340,039 B2 * | 12/2012 | Akirav et al. | 370/329 |
| 8,348,675 B2 | 1/2013 | Dohrmann | |
| 8,364,136 B2 | 1/2013 | Hoffberg et al. | |
| 2002/0059505 A1 | 5/2002 | St. Pierre et al. | |
| 2002/0091710 A1 | 7/2002 | Dunham et al. | |
| 2003/0074378 A1 | 4/2003 | Midgley et al. | |
| 2003/0105912 A1 | 6/2003 | Noren | |
| 2003/0145248 A1 | 7/2003 | McNeil | |
| 2003/0158831 A1 | 8/2003 | Zaremba | |
| 2003/0177149 A1 | 9/2003 | Coombs | |
| 2005/0108486 A1 | 5/2005 | Sandorfi | |
| 2005/0193235 A1 | 9/2005 | Sandorfi et al. | |
| 2006/0059207 A1 | 3/2006 | Hirsch et al. | |
| 2007/0050423 A1 | 3/2007 | Whalen et al. | |
| 2007/0101074 A1 | 5/2007 | Patterson | |
| 2007/0255758 A1 | 11/2007 | Zheng et al. | |
| 2008/0016131 A1 | 1/2008 | Sandorfi et al. | |
| 2008/0028007 A1 | 1/2008 | Ishii et al. | |
| 2008/0034017 A1 | 2/2008 | Giampaolo et al. | |
| 2008/0082310 A1 | 4/2008 | Sandorfi et al. | |
| 2008/0184001 A1 | 7/2008 | Stager | |
| 2008/0243914 A1 | 10/2008 | Prahlad et al. | |
| 2008/0275911 A1 | 11/2008 | Sandorfi et al. | |
| 2008/0294696 A1 | 11/2008 | Frandzel | |
| 2008/0301134 A1 | 12/2008 | Miller et al. | |
| 2009/0172326 A1 | 7/2009 | Sandorfi | |
| 2009/0177661 A1 | 7/2009 | Sandorfi et al. | |
| 2009/0193219 A1 | 7/2009 | Ohira et al. | |
| 2009/0300321 A1 * | 12/2009 | Balachandran et al. | 711/216 |
| 2009/0307251 A1 | 12/2009 | Heller et al. | |
| 2010/0017487 A1 | 1/2010 | Patinkin | |
| 2010/0088296 A1 | 4/2010 | Periyagaram et al. | |
| 2010/0188273 A1 * | 7/2010 | He et al. | 341/87 |
| 2010/0198797 A1 * | 8/2010 | Wideman | 707/692 |
| 2011/0016095 A1 * | 1/2011 | Anglin et al. | 707/692 |
| 2011/0022989 A1 | 1/2011 | Lin et al. | |
| 2011/0099200 A1 | 4/2011 | Blount et al. | |
| 2011/0184921 A1 | 7/2011 | Reiter et al. | |
| 2011/0184966 A1 | 7/2011 | Reiter et al. | |
| 2011/0184967 A1 | 7/2011 | Reiter et al. | |
| 2011/0185133 A1 | 7/2011 | Reiter et al. | |
| 2011/0273982 A1 * | 11/2011 | Akirav et al. | 370/230 |
| 2011/0307447 A1 * | 12/2011 | Sabaa et al. | 707/637 |
| 2012/0089574 A1 * | 4/2012 | Doerner | 707/654 |
| 2012/0150954 A1 * | 6/2012 | Tofano | 709/204 |
| 2012/0166448 A1 * | 6/2012 | Li et al. | 707/747 |
| 2012/0191669 A1 | 7/2012 | Kennedy et al. | |
| 2012/0191670 A1 * | 7/2012 | Kennedy et al. | 707/692 |
| 2012/0253484 A1 | 10/2012 | Burich et al. | |
| 2012/0254934 A1 | 10/2012 | McBrearty et al. | |

OTHER PUBLICATIONS

Zhu et al, "Avoiding the Disk Bottleneck in the Data Domain Deduplication File System", 2008.*

Meiri et al. "Parallel Compression of Correlated Files". 2007 IEEE International Conference on Cluster Computing. pp. 285-292. Sep. 2007.

* cited by examiner

DYNAMIC DEDUPLICATION

CROSS REFERENCES TO RELATED APPLICATIONS

This application relates to and is assigned to the same entity as the co-pending application identified by entitled "Detection and Deduplication of Backup Sets Exhibiting Poor Locality," U.S. patent application Ser. No. 13/013,403, filed on Jan. 25, 2011, the disclosure of which is hereby incorporated herein by reference in its entirety.

FIELD OF THE INVENTION

The present invention relates generally to computer-based methods and apparatuses, including computer program products, for dynamic deduplication.

BACKGROUND

Given the costs associated with conventional tape libraries and other sorts of back-up storage media, storage system vendors often incorporate deduplication processes into their product offerings to decrease the amount of required back-up media. Deduplication is a process of identifying repeating sequences of data and preventing or removing redundant storage of the repeating sequences of data. Deduplication is typically implemented as a function of a target device, such as a back-up storage device.

The act of identifying and deduplicating redundant data within back-up data streams can be a complex process. Data deduplication can be further complicated when the back-up data streams exhibit poor locality. Poor locality refers to data which is "close together" in a first backup data set but separated by "large" distances in a subsequent backup data set. For example, a first backup data set may include two sets of data (e.g., data files) separated by 20 megabytes of data, whereas a second backup data set includes the two sets of data but they are separated by 2 gigabytes of data.

A backup procedure known as "multiplexing" often causes poor locality in backup data sets (e.g., data sets that represent the backup of a computer system). Multiplexing is a technique wherein a backup application reads from multiple files on disk and then writes those blocks to the same backup set. For different backups of the same data, the disks or files could be experiencing different loads (e.g., from non-backup requests) and therefore the same data could be distributed quite differently from one backup to another, resulting in a large locality discrepancy. For example, Structured Query Language (SQL) databases (e.g., mySQL databases) and/or databases provided by Oracle Corporation of Redwood Shores, Calif. can employ multiplexing to speed up the backup process. Therefore it is advantageous to properly detect and deduplicate backup data that exhibits poor locality.

SUMMARY OF THE INVENTION

Different types of backup data sets can be properly and efficiently deduplicated by detecting the type of data contained within the backup data sets, and adjusting the detection and deduplication process (e.g., the associated algorithms) to handle the particular type of data (or category of data). Similarly, moving averages of performance metrics of the deduplication process can be calculated to determine when the deduplication process is, for example, inefficiently or poorly deduplicating data sets. Detection and deduplication parameters can be adjusted based on the moving averages.

The invention, in one aspect, features a computerized method for storing data. The method includes determining, by a computing device, a first set of summaries of a first data set, each summary of the first set of summaries being indicative of a data pattern in the first data set at an associated location in the first data set. The method includes determining, by the computing device, a second set of summaries of a second data set, each summary of the second set of summaries being indicative of a data pattern in the second data set at an associated location in the second data set. The method includes calculating, by the computing device, a set of comparison metrics, each comparison metric being based on a first subset of summaries from the first set of summaries and a second subset of summaries from the second set of summaries. The method includes calculating, by the computing device, a locality metric based on the set of comparison metrics indicative of whether the first data set and second data set exhibit poor locality.

The invention, in another aspect, features a computer program product, tangibly embodied in a non-transitory computer readable medium. The computer program product includes instructions configured to cause a data processing apparatus to determine a first set of summaries of a first data set, each summary of the first set of summaries being indicative of a data pattern in the first data set at an associated location in the first data set. The computer program product includes instructions configured to cause a data processing apparatus to determine a second set of summaries of a second data set, each summary of the second set of summaries being indicative of a data pattern in the second data set at an associated location in the second data set. The computer program product includes instructions configured to cause a data processing apparatus to calculate a set of comparison metrics, each comparison metric being based on a first subset of summaries from the first set of summaries and a second subset of summaries from the second set of summaries. The computer program product includes instructions configured to cause a data processing apparatus to calculate a locality metric based on the set of comparison metrics indicative of whether the first data set and second data set exhibit poor locality.

The invention, in another aspect, features an apparatus comprising a processor and memory. The apparatus is configured to determine a first set of summaries of a first data set, each summary of the first set of summaries being indicative of a data pattern in the first data set at an associated location in the first data set. The apparatus is configured to determine a second set of summaries of a second data set, each summary of the second set of summaries being indicative of a data pattern in the second data set at an associated location in the second data set. The apparatus is configured to calculate a set of comparison metrics, each comparison metric being based on a first subset of summaries from the first set of summaries and a second subset of summaries from the second set of summaries. The apparatus is configured to calculate a locality metric based on the set of comparison metrics indicative of whether the first data set and second data set exhibit poor locality.

The invention, in another aspect, features a computerized method for storing data. The method includes processing, by a computing device, data using an algorithm that deduplicates the data based on a first set of parameters. The method includes calculating, by the computing device, a first moving average of a first deduplication performance metric for the algorithm over a time period. The method includes calculating, by the computing device, a second moving average of a second deduplication performance metric for the algorithm over the time period. The method includes determining, by the computing device, the first moving average satisfies a first criterion, the second moving average satisfies a second criterion, or both. The method includes reconfiguring, by the computing device, the algorithm based on a second set of parameters to deduplicate data.

The invention, in another aspect, features a computer program product, tangibly embodied in a non-transitory computer readable medium. The computer program product includes instructions configured to cause a data processing apparatus to process data using an algorithm that deduplicates the data based on a first set of parameters. The computer program product includes instructions configured to cause a data processing apparatus to calculate a first moving average of a first deduplication performance metric for the algorithm over a time period. The computer program product includes instructions configured to cause a data processing apparatus to calculate a second moving average of a second deduplication performance metric for the algorithm over the time period. The computer program product includes instructions configured to cause a data processing apparatus to determine the first moving average satisfies a first criterion, the second moving average satisfies a second criterion, or both. The computer program product includes instructions configured to cause a data processing apparatus to reconfigure the algorithm based on a second set of parameters to deduplicate data.

The invention, in another aspect, features an apparatus comprising a processor and memory. The apparatus is configured to process data using an algorithm that deduplicates the data based on a first set of parameters. The apparatus is configured to calculate a first moving average of a first deduplication performance metric for the algorithm over a time period. The apparatus is configured to calculate a second moving average of a second deduplication performance metric for the algorithm over the time period. The apparatus is configured to determine the first moving average satisfies a first criterion, the second moving average satisfies a second criterion, or both. The apparatus is configured to reconfigure the algorithm based on a second set of parameters to deduplicate data.

In other examples, any of the aspects above can include one or more of the following features. Calculating the set of comparison metrics can include identifying a first summary from the first set of summaries that is similar to a second summary and a third summary from the second set of summaries, and calculating a distance between the second summary and the third summary. It can be determined that the distance is greater than a predetermined threshold, and a poor locality metric can be stored in the set of comparison metrics based on the distance. It can be determined the distance is not greater than a predetermined threshold, and a good locality metric can be stored in the set of comparison metrics based on the distance. It can be determined that a first summary from the first set of summaries is similar to a plurality of summaries from the second set of summaries, and a comparison metric is not calculated based on the first summary.

In some examples, calculating the locality metric includes calculating a statistic of the set of comparison metrics. Calculating the statistic can include determining a comparison metric in the set of comparison metrics is greater than a maximum metric, and filtering the comparison metric from the set of comparison metrics. It can be determined whether the statistic is greater than a predetermined threshold. If the statistic is greater than the predetermined threshold, a percentage can be calculated based on a set of poor comparison metrics from the set of comparison metrics and a set of good comparison metrics from the set of comparison metrics.

In other examples, it is determined whether the percentage is greater than a predetermined percentage, and if the percentage is greater than the predetermined percentage, the locality metric is set to be indicative of the first data set and second data set exhibiting poor locality, and if the percentage is not greater than the predetermined percentage, the locality metric is set to be indicative of the first data set and second data set not exhibiting poor locality. If the statistic is not greater than the predetermined threshold, the locality metric can be set to be indicative of the first data set and second data set not exhibiting poor locality.

In some examples, the locality metric is determined to be indicative of the first data set and second data set exhibiting poor locality, and a set of detection parameters, a set of deduplication parameters, or both, are adjusted. The first set of summaries and the second set of summaries can be calculated based on a predetermined amount of data, and wherein adjusting can include reducing the predetermined amount of data. A predetermined number of characterizations can be calculated for each summary in the first set of summaries and the second set of summaries, and wherein adjusting can include reducing the predetermined number of characterizations.

In other examples, determining includes determining the first data set, the second data set, or both, are multiplexed backup data sets. A third set of summaries of a third data set can be determined, each summary of the third set of summaries being indicative of a data pattern in the third data set at an associated location in the third data set, a set of comparison metrics can be calculated, each comparison metric being based on the first subset of summaries and a third subset of summaries from the third set of summaries, and a locality metric can be calculated based on the set of comparison metrics indicative of whether the first data set and third data set exhibit poor locality.

In some examples, calculating the first moving average includes calculating a first exponentially weighted moving average of the first performance metric over the time period, and calculating the second moving average includes calculating a second exponentially weighted moving average of the second performance metric over the time period. Calculating the first exponentially weighted moving average can include calculating the first exponentially weighted moving average based on a first performance metric value at a current time, an exponentially weighted moving average for the first performance metric at a previous time, and an update parameter. Calculating the second exponentially weighted moving average can include calculating the second exponentially weighted moving average based on a second performance metric value at a current time, an exponentially weighted moving average for the second performance metric at a previous time, and an update parameter.

In other examples, the first set of parameters causes the algorithm to deduplicate the data based on a first operating mode, and wherein the second set of parameters causes the algorithm to deduplicate the data based on a second operating mode. Reconfiguring can include generating the second set of parameters by adjusting one or more parameters in the first set of parameters. Adjusting can include changing a fingerprint match parameter in the first set of parameters from a first value to a second value.

In some examples, a third moving average of the first deduplication performance metric is calculated over a second time period, a fourth moving average of the second deduplication performance metric is calculated over the second time period, the third moving average is determined to satisfy the first criterion, the fourth moving average is determined to satisfy the second criterion, or both, and the algorithm is reconfigured based on the first set of parameters to deduplicate data. The first performance metric can be a deduplication speed metric for the algorithm and the second performance metric can be a deduplication ratio metric for the algorithm.

The techniques, which include both methods and apparatuses, described herein can provide one or more of the following advantages. Incoming data can be analyzed to determine how to best process the data (e.g., based on the type of the data or a characterization of the data). System parameters can be adjusted based on the type of data (e.g., to adapt the system for the incoming data). Moving averages can be used to maintain meaningful measurements of multiple performance metrics of system processes. The system can respond to the moving averages to, for example, adaptively switch between operating modes of the system (e.g., based on the types of data being processed by the system).

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems and methods are provided for detecting whether data sets exhibit poor locality, and adjusting the system accordingly. Computerized systems and methods are also provided for calculating moving averages of performance metrics and adjusting the system based on the performance metrics.

Figure 1:
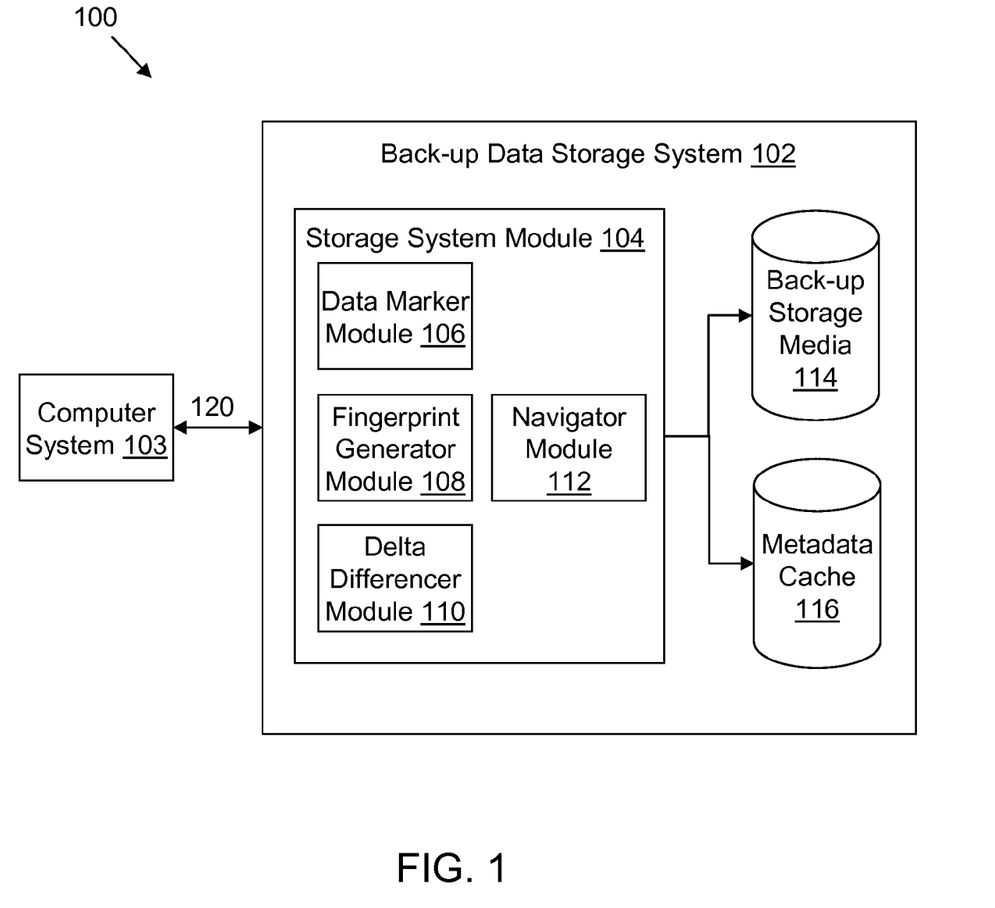
FIG. 1 is an exemplary diagram of a back-up data storage system according to the present invention.

FIG. 1 is an exemplary diagram 100 of a back-up data storage system 102 according to the present invention. The back-up storage system 102 is in communication with a computer system 120 (running the back-up/restore application). As shown, the storage system module 104 includes a data marker module 106, a fingerprint generator module 108, a delta differencer module 110 and a navigator module 112. The back-up data storage system 102 includes a back-up storage media 114 and a metadata cache 116. The storage system 102 is an example of a computerized system that is specially configured to perform the computerized methods described herein. However, the system structure and content recited with regard to FIG. 1 are for exemplary purposes only and are not intended to limit other examples to the specific structure shown in FIG. 1. As will be apparent to one of ordinary skill in the art, many variant system structures can be architected without departing from the computerized systems and methods described herein.

Generally, the storage system 102 establishes location identifiers (referred to as "ticks") within regions (referred to as "windows") of data targeted for deduplication and within corresponding reference data (e.g., previously stored data). Further, according to these examples, location identifiers indicate locations where summaries that characterize the contents of the regions are created. The summaries are then used to determine which regions of the targeted data are likely to include data redundant with regions of the reference data. In some examples, the summaries are sets with elements that are themselves sets of hash values. Additionally, in these examples, an area of the targeted data (referred to as a "swath") is identified and deduplicated with reference to a corresponding swath of reference data. In at least one example, the swath includes not only the regions of the data that have been determined to be most likely to include redundant data but also additional data, as is discussed further below.

The computer system 103 is coupled to the storage system 102 via a network 120. The network 120 may include one or more networks that support a variety of communication protocols. For example, the network 120 may be a public network, such as the interne, and may include other public or private networks such as LANs, WANs, extranets and intranets. According to some embodiments, the network 120 is a Fibre Channel network that allows high-speed transfer of data between the computer system 103 and the storage system 102. While the storage system 102 is shown in communication with only computer system 103, the storage system 102 may enable back-up of data from, for example, a plurality of computers (not shown) or from a primary storage device, such as network accessible data storage.

Referring to the data marker module 106, the module is configured to determine location identifiers within the data to serve as markers used during subsequent deduplication processing. In some examples, the data marker module 106 is configured to mark (e.g. record) a location identifier when the data at or near the location possesses some predetermined characteristic. Advantageously, for example, the data marker module 106 can produce (e.g., consistently) location identifiers at the same locations within a given set of data.

Referring to the fingerprint generator module 108, the module is configured to generate summaries (e.g., also referred to as fingerprints) for portions of data (e.g., the portions of data can be referred to as "navigation windows") that include a multiple number of location identifiers (e.g., generated by the data marker module 106). The storage system module 104 can use the summaries (or fingerprints) to determine whether a set of data might include data that is redundant with another set of data. In some examples, the fingerprint generator module 108 is configured to store weak hash value pairs that are associated with location identifiers falling with a particular navigation window. These weak hash value pairs can be generated by, for example, a weak hash function (e.g., a computationally efficient hash function).

The fingerprint generator module 108 is configured to store (e.g., within the logical metadata cache 116) the resulting set of weak hash value pairs as the fingerprint associated with each examined portion (e.g., associated with each navigation window). Advantageously, the fingerprint generator module 108 creates fingerprints that characterize the contents of the navigation windows. The fingerprints can be, for example, sets with elements that are pairs of weak hash values. In some examples, the fingerprints are sets with elements that are themselves sets other than pairs. Therefore, the elements of a fingerprint can be a single element set or multiple element sets and examples are not limited to a particular number of members within each element of a fingerprint.

In some examples, the fingerprint generator module 108 is configured to characterize the portions of data disposed after the location identifiers. In some examples, these characterizations (e.g., weak hash values) are used to build aggregate summaries that characterize navigation windows within target data and reference data. For example, the fingerprint generator module 108 can generate a weak hash value using an amount of data located after each location identifier having a size equal to a predetermined hash size criterion. The fingerprint generator module 108 can pair this weak hash value with a weak hash value associated with the previous location identifier (e.g., if there is a previous location identifier) and associate the weak hash value pair with the navigation window.

Referring to the navigator module 112, the module is configured to navigate to areas of redundant data contained within two or more sets of data and position swaths (e.g., identified areas of data) relative to those areas. In these examples, the navigator module 112 can navigate data regardless of the source of the fingerprints that characterize the data (including, for example, data that has not been prepared using the data marker module 106). The navigator module 112 is configured, for example, to utilize prioritized sets of data summaries (such as hash values) that are included within the fingerprints to identify potentially redundant areas of data, even if those areas are located in different positions within the two or more sets of data. In some examples the navigator module 112 is configured to position a single target swath and a single reference swath. In some examples, the navigator module 112 is configured to position one or more target swaths and one or more reference swaths. The navigator module 112 can execute the deduplication process based on a set of parameters that define how the deduplication process is executed.

Referring to the delta differencer module 110, the module is configured to execute a byte-for-byte deduplication process between two data sets. In some examples, the delta differencer module 110 removes redundant data by replacing redundant data in a first data set (e.g., a newest/most recently received data set, referred to herein as a "reference data set") with indicators to the redundant data in a second data set (e.g., an older data set, referred to herein as a "target data set"). The set of parameters can be adjusted based on the data sets (e.g., based on a locality metric), which is described further below with reference to FIG. 5.

Referring to the back-up storage media 114, the media may be, for example, one or more disk arrays. The back-up storage media 114 can provide, for example, the actual storage space for back-up data from the computer system 103. Referring to the metadata cache 116, the cache is configured to store metadata relating to data that is backed-up from the computer system 103 onto the storage system 102. Metadata is, for example, data that represents information about data and describes attributes of actual data. A non-limiting, exemplary list of metadata includes hash values, location identifiers, data size, logical and/or physical location of the data in primary storage, one or more hash values representing the data, the creation date of the data, the date of the last modification of the data, the back-up policy name under which the data was stored, an identifier (e.g. a name or watermark) of the data, and the data type of the data (e.g. a software application associated with the data).

The back-up data storage system 102 can include, for example, features and/or components of the back-up data storage system described in U.S. patent application Ser. No. 12/877,719, entitled "System and Method for Data Driven De-Duplication," filed on Sep. 8, 2010, the disclosure of which is hereby incorporated by reference herein in its entirety. The components of the back-up data storage system 102 are described in further detail therein.

Figure 2:
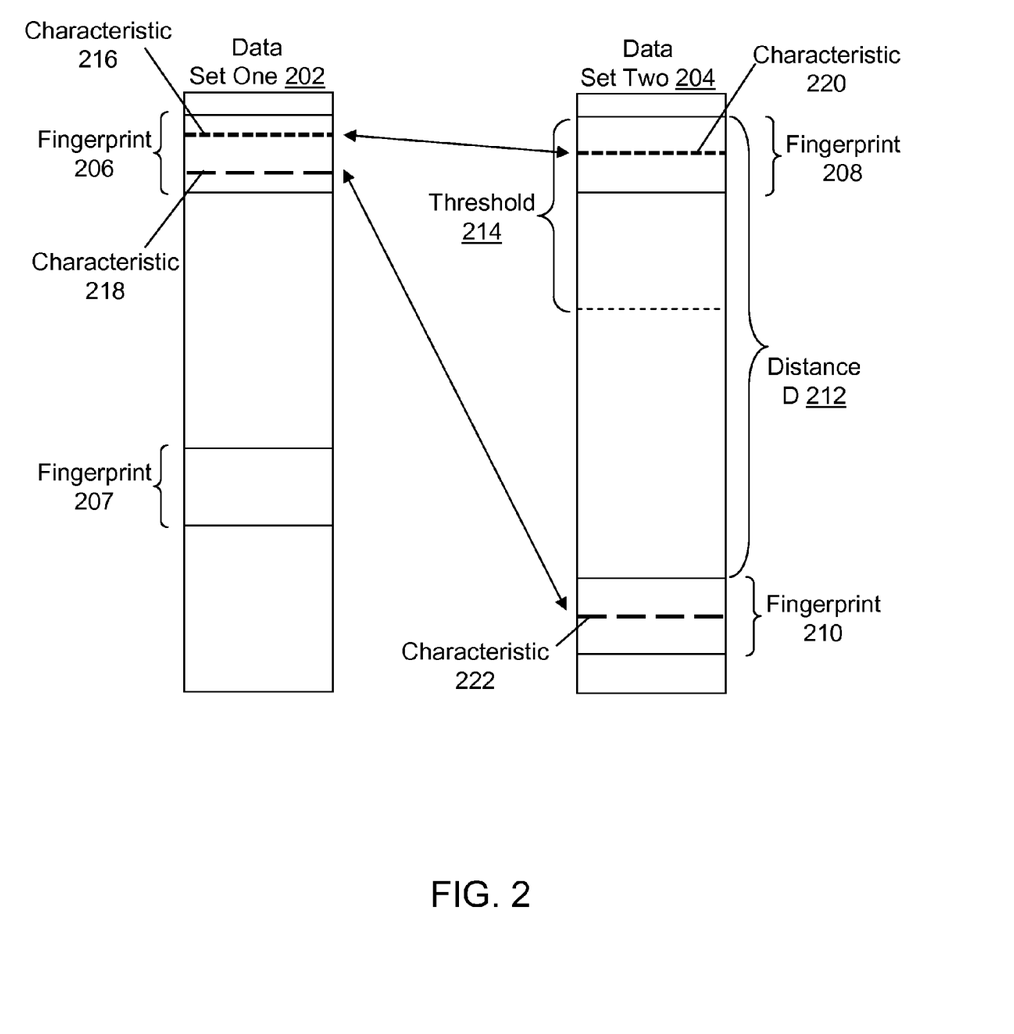
FIG. 2 is an exemplary diagram of two data sets used in a deduplication process according to the present invention.

The storage system 102 can store data on the back-up storage media 114 in discrete data sets that correspond to back-ups taken at different times or using different methodologies (for example, full or incremental back-ups). FIG. 2 is an exemplary diagram 200 of two data sets, data set one 202 and data set two 204 used in a deduplication process according to the present invention. Data set one 202 includes two fingerprints 206 and 208 (e.g., generated by the fingerprint generator module 108). Data set two 204 includes two fingerprints 208 and 210. Fingerprint 208 is a distance D 212 from fingerprint 210. For example, the beginning of fingerprint 208 is separated from the beginning of fingerprint 210 by the data contained in data set two 204 represented by distance D 210 (e.g., which includes fingerprint 208 and the other data in data set two 204 between fingerprint 208 and fingerprint 210). FIG. 2 depicts a threshold 214 in data set two 204, which is discussed in further detail with respect to FIG. 4.

In some examples, the back-up storage system 102 performs a deduplication process on data that is stored on the back-up storage media 114, such as the data sets 202 and 204 illustrated in FIG. 2. The delta difference module 110 can perform data deduplication in-line (e.g., while the storage system 102 is receiving data to be deduplicated and stored). In some examples, the delta difference module 110 performs deduplication off-line (e.g., after the storage system 102 has already stored the data to be deduplicated).

In some examples, the data set 202 is targeted for deduplication and includes target regions identified by fingerprints 206 and 207. The fingerprints 208 and 210, the reference fingerprints, may summarize data from, for example, partial or incremental backups of one or more primary systems. Data set 204 can be used as a reference data set during the deduplication of data set 202.

Fingerprint 206 includes redundant data across data sets one 202 and two 204 (e.g., as identified by the navigator module 112). Fingerprint 206 includes a set of characteristics (e.g., hash value pairs), which includes characteristics 216 and 218. Fingerprint 208 includes a set of characteristics including characteristic 220. Fingerprint 210 includes a set of characteristic including characteristic 222. Characteristic 216 is similar to characteristic 220, and characteristic 218 is similar to characteristic 222. Therefore, there is redundant data across data sets one 202 and two 204. For example, the target region summarized by fingerprint 206 contains the data described by characteristic 216, which is the same data as the data within the reference region summarized by fingerprint 206B at characteristic 220.

While data set 202 includes two fingerprints 206 and 207 and data set 204 includes two fingerprints 208 and 210 (e.g., each of which represents a target region or reference region), other examples can work with data sets which include only one target region and one reference region or multiple fingerprints per region. Thus, examples are not limited to a particular number of data sets, target regions or reference regions, or fingerprints. For example, data sets one 202 and two 204 can include any number of fingerprints. Similarly, data set one 202 can be compared against not only data set two 204, but also other data sets (not shown).

Figure 3:
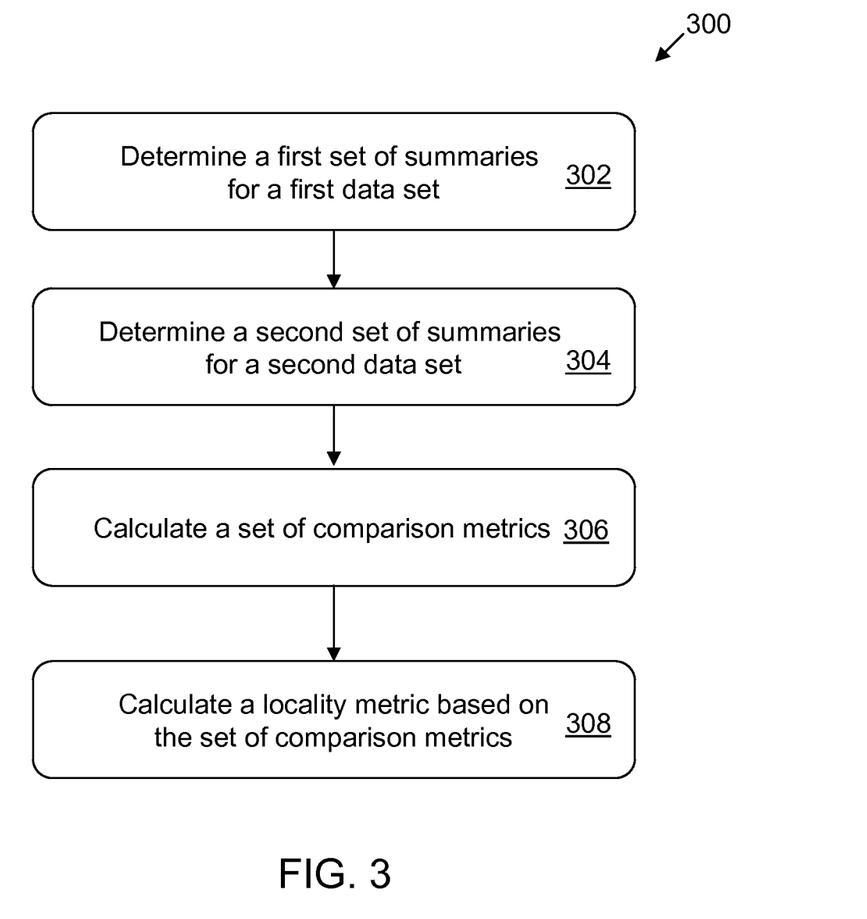
FIG. 3 is a diagram of an exemplary computerized method for determining whether data sets exhibit poor locality.

Data set one 202 and two 204 may include multiplexed data, or data that exhibits poor locality. FIG. 3 is a diagram of an exemplary computerized method 300 for determining whether data sets exhibit poor locality. Referring to FIG. 2, at step 302 the navigator module 112 determines a first set of summaries (e.g., fingerprint 206 and 208) of data set one 202. At step 304, the navigator module 112 determines a second set of summaries (e.g., fingerprints 208 and 210) of data set two 204. At step 306, the navigator module 112 calculates a set of comparison metrics between data set one 202 and data set two 204. At step 308, the navigator module 112 calculates a locality metric based on the set of comparison metrics.

Referring to steps 302 and 304, each summary includes, for example, a set of characteristics that are indicative of a data patterns in the associated data set. For example, fingerprint 206 includes characteristics 216 and 218 that describe the data within the navigation window defined by fingerprint 206 (e.g., the area shown by the box representing fingerprint 206). The term summary is used to indicate that the summary includes characteristics, features, and other information about the data.

Referring to step 306 the navigator module 112 calculates each comparison metric based on, for example, a subset of summaries from data set one 202 and a subset of summaries from data set two 204. The subset of summaries can include one or more summaries. For example, a subset of summaries from data set one 202 can include fingerprint 206, fingerprints 206 and 207, or fingerprints 206 and 207 in combination with other fingerprints in data set one 202 (not shown). In some embodiments, the navigator module 112 calculates a comparison metric based on one summary from the data set one 202 and two summaries from data set two 204, as is explained in further detail with reference to FIG. 4. The comparison metrics can be, for example, distances between summaries within a data set (e.g., a distance between two summaries in data set two 204, both of which are similar to a summary in data set one 202).

Referring to method 300, the method can be performed for multiple data sets (e.g., not just data set one 202 and data set two 204). In some embodiments, the navigator module 112 executes steps 304-308 among a plurality of data sets. For example, the navigator module 112 can execute steps 304-308 between data set one 202 and data set two 204 and/or between data set one 202 and other data sets (not shown). Advantageously, data set one 202 can be compared against a plurality of data sets (e.g., simultaneously) to determine whether data set one 202 exhibits poor locality.

Figure 4:
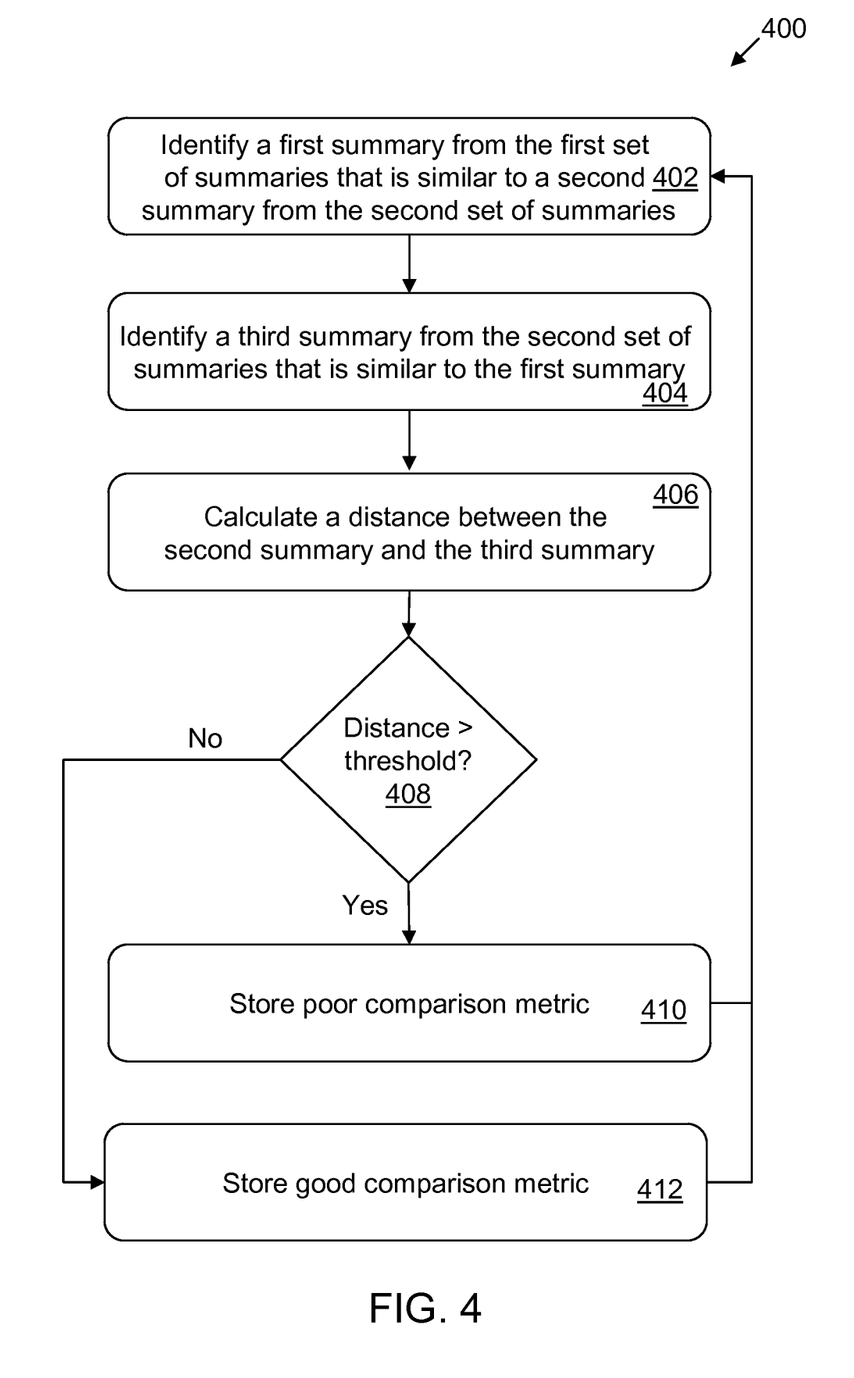
FIG. 4 is a diagram of an exemplary computerized method for calculating a set of comparison metrics.

FIG. 4 is a diagram of an exemplary computerized method 400 for calculating a set of comparison metrics. Referring to FIG. 2, at step 402 the navigator module 112 identifies a first summary (fingerprint 206) from the first set of summaries (fingerprints 206 and 207) that is similar to a second summary (fingerprint 208) from the second set of summaries (fingerprints 208 and 210). At step 404, the navigator module 112 identifies a third summary (fingerprint 210) from the second set of summaries that is similar to the first summary (fingerprint 206). At step 406, the navigator module 112 calculates a distance between the second summary (fingerprint 208) and the third summary (fingerprint 210) (shown as distance D 212 in FIG. 2). At step 408, the navigator module 112 determines whether the distance is greater than the threshold (threshold 214). If the navigator module 112 determines the distance is not greater than the threshold, the method 400 proceeds to step 412 and the navigator module 112 stores a good comparison metric in the set of comparison metrics based on the distance. If the navigator module 112 determines the distance is greater than the threshold, the navigator module 112 proceeds to step 410 and stores a poor comparison metric in the set of comparison metrics. Steps 410 and 412 can proceed back to step 402 and the navigator module 112 begins method 400 again by selecting new summaries.

Referring to steps 402 and 404, for example, the navigator module 112 determines that characteristic 216 (e.g., a hash value pair) of fingerprint 206 is similar to (e.g., matches) characteristic 220 of fingerprint 208. The navigator module 112 determines that characteristic 218 of fingerprint 206 is similar to characteristic 222 of fingerprint 210. Referring to step 406, the navigator module 112 calculates a distance between fingerprint 208 and fingerprint 210. For example, the navigator module 112 can calculate distance D 212, which is the distance from the beginning of fingerprint 208 to the beginning of fingerprint 210 (e.g., as shown in FIG. 2, distance D 212 includes the data in fingerprint 208 as well as the data between fingerprint 208 and 210). In other examples, the navigator module 112 can calculate the distance D 212 based on other start and end points. For example, the navigator module 112 can calculate distance D 212 between the matching characteristics (e.g., characteristic 220 and characteristic 222), and/or from the end of the first summary to the beginning of the second summary (e.g., from the end of fingerprint 208 to the beginning of fingerprint 210).

Figure 7:
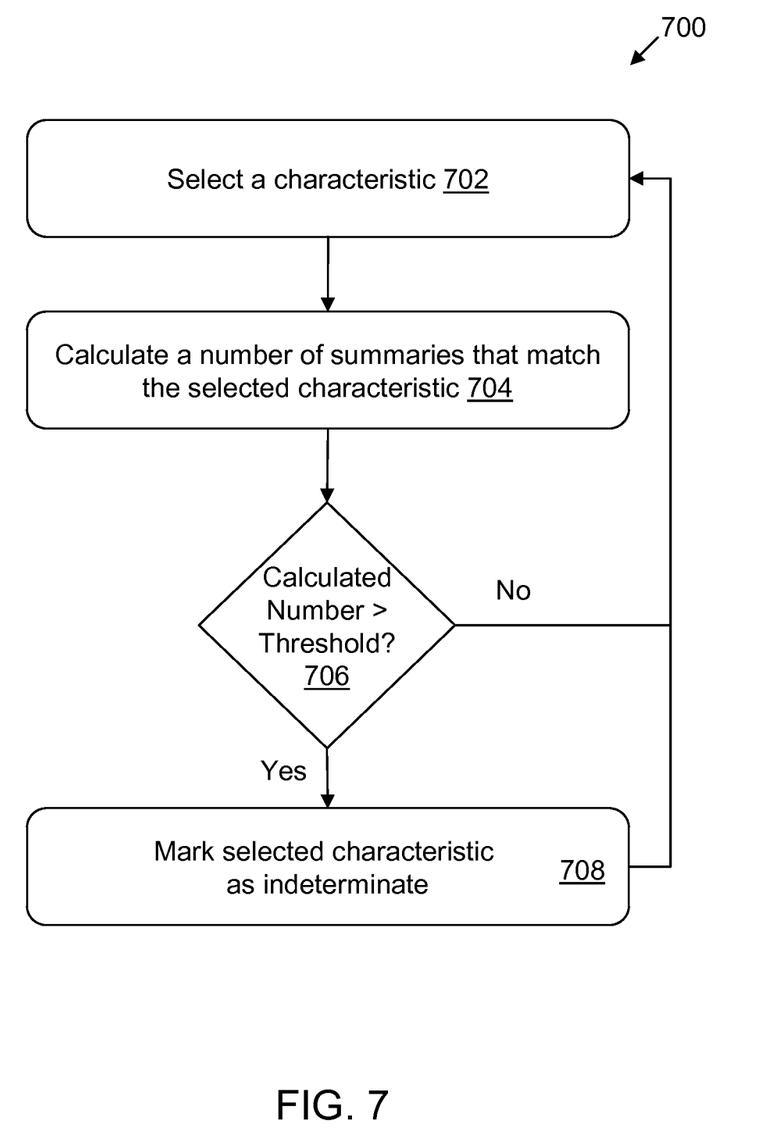
FIG. 7 is a diagram of an exemplary computerized method for determining whether a characteristic is indeterminate.

Referring further to steps 402 and 404, the navigator module 112 can determine that a summary from data set one 202 (e.g., fingerprint 206) is similar to a plurality of summaries from data set two 204. FIG. 7 is a diagram of an exemplary computerized method 700 for determining whether a characteristic is indeterminate. At step 702, the navigator module 112 selects a characteristic (e.g., characteristic 216). At step 704, the navigator module 112 calculates a number of summaries that match the selected characteristic. At step 706, the navigator module 112 determines whether the calculated number is greater than a predetermined threshold. If the navigator module 112 determines the calculated number is not greater than the predetermined threshold, the method proceeds back to step 702 and the navigator module 112 selects a different characteristic. If the navigator module 112 determines the calculated number is greater than the predetermined threshold, the method proceeds to step 708 and the navigator module 112 marks the characteristic as indeterminate. For example, the navigator module 112 selects characteristic 216 (702) and calculates (704) a number representative of how many characteristics in the data set two 204 are similar to selected characteristic 216. If the calculated number is greater than the threshold (706), the navigator module 112 marks (708) characteristic 216 as indeterminate (e.g., characteristic 216 matches so many other characteristics that it is not indicative of a strong similarity with any of the characteristics). The navigator module 112 can identify an indeterminate characteristic and not calculate a comparison metric based on the indeterminate characteristic.

Referring to step 408, the navigator module 112 can store a good comparison metric in the set of comparison metrics based on the distance if the distance is not greater than the threshold (step 412). Method 400 iterates among the summaries in data set one 202 and data set two 204 until the navigator module 112 calculates a predetermined number of comparison metrics between data set one 202 and data set two 204 (e.g., until the navigator module 112 iterates through all of the fingerprints in data sets one 202 and two 204). For example, the navigator module 112 can next select fingerprint 207 and evaluate characteristics within fingerprint 207 (not shown) to calculate comparison metrics based on fingerprint 207 and the fingerprints in the second data set 204.

Referring to steps 410 and 412, the navigator module 112 stores, for example, a comparison metric in the set of comparison metrics based on the distance. For example, the comparison metric can be the distance between two fingerprints. Advantageously, step 306 can iterate through fingerprints in data set one 202 to locate the matching (or similar) locations of hash values in each fingerprint in data set two 204. For example, if the navigator module 112 determines that at least two of the hash values for a fingerprint are similar to (e.g., have unique matches) to fingerprints in data set two 204, the navigator module 112 can analyze the distance between the fingerprints in data set two 204. If the navigator module 112 determines the fingerprints in data set two 204 a distance between them greater than a predetermined distance, the navigator module 112 can mark the distance as a poor locality match and store the distance in the set of comparison metrics (step 410). If the navigator module 112 determines the fingerprints in data set two 204 do not exceed the predetermined distance, then the navigator module 112 can record a comparison metric in the set of comparison metrics indicative of the distance being less than the threshold (step 412).

Figure 5:
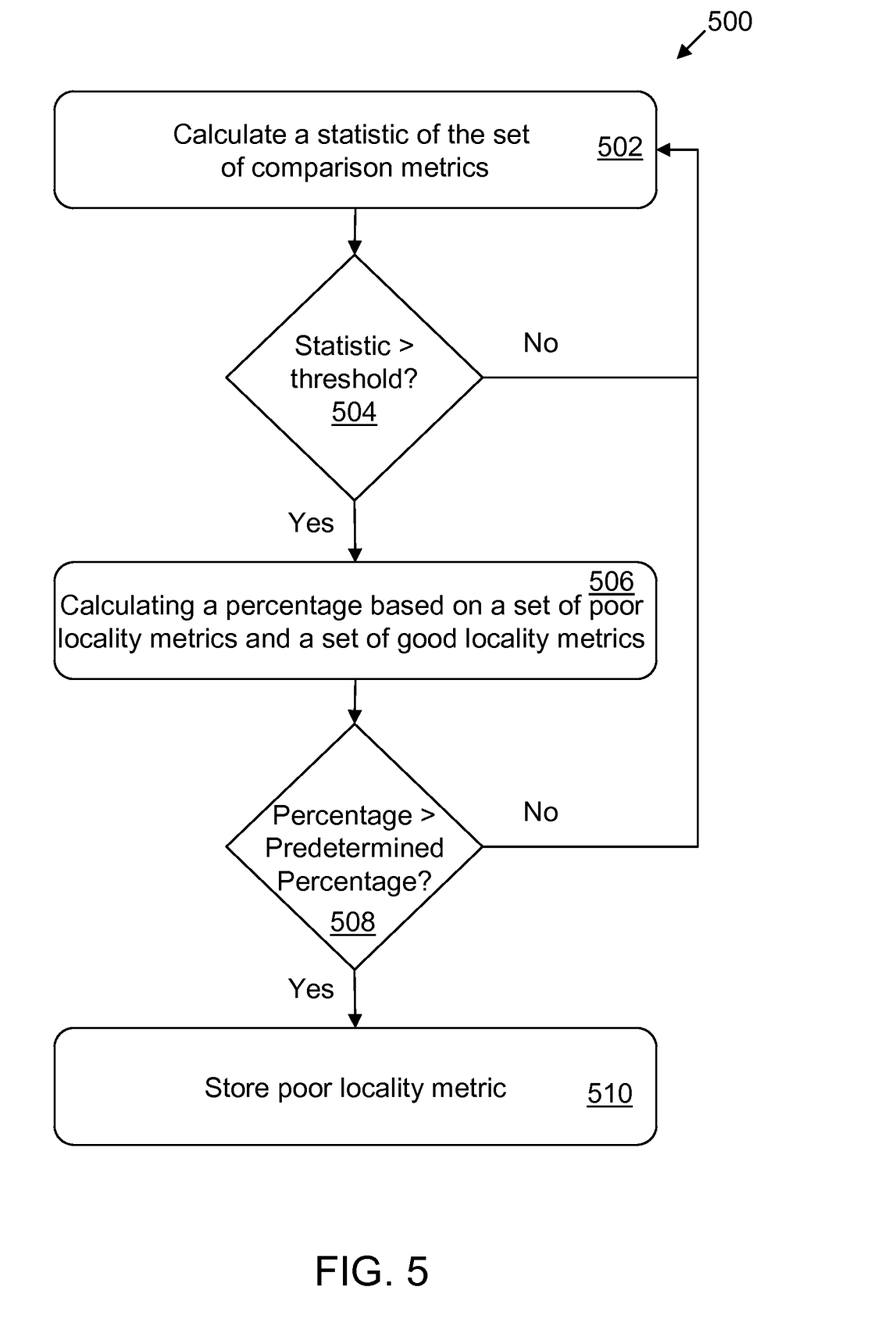
FIG. 5 is a diagram of an exemplary computerized method for calculating a locality metric.

Referring to step 308, the navigator module 112 calculates a locality metric based on the set of comparison metrics. The locality metric is indicative of whether data set one 202 and data set two 204 exhibit poor locality (e.g., whether the first and second data sets include multiplexed data). FIG. 5 is a diagram of an exemplary computerized method 500 for calculating a locality metric. For example, the locality metric can indicate whether a data set exhibits poor locality based on the set of comparison metrics. At step 502, the navigator module 112 calculates a statistic of the set of comparison metrics. At step 504, the navigator module 112 determines whether the statistic is greater than a predetermined threshold. If the navigator module 112 determines the statistic is not greater than the predetermined threshold, the method 500 proceeds back to step 502. If the statistic is not greater than the predetermined threshold, the data set is marked as not exhibiting poor locality.

If the navigator module 112 determines the statistic is greater than the predetermined threshold, the method proceeds to step 506 and the navigator module 112 calculates a percentage (e.g., a ratio) based on a set of poor locality metrics from the set of comparison metrics and a set of good locality metrics from the set of comparison metrics. At step 508, the navigator module 112 determines whether the percentage is greater than a predetermined percentage. If the navigator module 112 determines the percentage is greater than the predetermined percentage, the method 500 proceeds to step 510 and the navigator module 112 stores a poor locality metric. For example, the navigator module 112 can set a locality metric for data set one 202 that is indicative of data set one 202 and data set two 204 exhibiting poor locality. If the navigator module 112 determines the percentage is not greater than the predetermined percentage, the method 500 proceeds back to step 500. In some examples, the navigator module 112 sets the locality metric for data set one 202 to be indicative of the data set one 202 and data set two 204 not exhibiting poor locality.

Referring to step 502, in some embodiments the navigator module 112 calculates an average of the set of comparison metrics. In some embodiments, the navigator module 112 can determine whether to include a comparison metric in the statistic. The navigator module 112 can determine whether a comparison metric in the set of comparison metrics is greater than a maximum metric. For example, the navigator module 112 can determine whether a distance (e.g., distance D 212) is greater than a maximum distance. If the navigator module 112 determines that a comparison metric is greater than the maximum metric, the navigator module 112 can filter the comparison metric from the set of comparison metrics. For example, the navigator module 112 can compensate for any comparison metrics that are greater than the maximum metric (e.g., by setting comparison metrics that are greater than the maximum metric to equal the maximum metric). Advantageously, the navigator module 112 can filter out any outlier comparison metrics that could skew the statistic.

Referring to step 504, if the navigator module 112 determines the statistic is not greater than the predetermined threshold, the navigator module 112 can set the locality metric indicative of data set one 202 and data set two 204 not exhibiting poor locality (e.g., the data sets do not include multiplexed data). If the statistic is greater than the predetermined threshold, at step 506 set of good locality metrics can include the comparison metrics in the set of comparison metrics that are indicative of the distance between two summaries not exceeding the threshold value (e.g., those distances recorded at step 412 of FIG. 2). The set of poor comparison metrics are the comparison metrics in the set of comparison metrics that are indicative of the distance between two summaries exceeding the threshold value (e.g., those distances at step 410 of FIG. 2).

Advantageously, the navigator module 112 can determine whether data sets it is processing exhibit poor locality. The backup data storage system 102 can use the locality determination to adjust the detection and/or deduplication process to compensate for the type of data being backed up. In some embodiments, the storage system 102 has two or more operating modes, where one operating mode is used to process data that does not exhibit poor locality, and a second operating mode is used to process data that exhibits poor locality. The storage system 102 can determine the locality metric is indicative of data set one 202 and data set two 204 exhibiting poor locality, and adjust a set of detection parameters (e.g., used by the data marker module 106, the fingerprint generator module 108 and/or the navigator module 112) and/or a set of deduplication parameters (e.g., used by the delta differencer module 110 to perform deduplication) to configure the storage system 102 to operate in a poor locality mode.

In some embodiments, the fingerprint generator module 108 can be configured to calculate summaries (e.g., the fingerprints for data set one 202 and/or data set two 204) based on a predetermined amount of data (e.g., a predetermined size for the navigation windows) for non-multiplexed data. If the navigator module 112 determines the data sets exhibit poor locality (e.g., as indicated by a locality metric that indicates the data includes, for example, multiplexed data or data that exhibits poor locality for other reasons), the navigator module 112 can reduce the predetermined amount of data (e.g., by adjusting a preconfigured parameter used by the fingerprint generator module 108). For example, the navigator module 112 can reduce the size of the navigation windows used to calculate the fingerprints, so the fingerprint generator module calculates fingerprints for smaller amounts of data.

In some embodiments, a predetermined number of characterizations are calculated for each summary in the first set of summaries and the second set of summaries for non-multiplexed data. For example, the fingerprint generator module 108 can be configured to calculate a predefined number of hash value pairs for each fingerprint. If the navigator module 112 determines the data sets include multiplexed data, the navigator module can adjust the number of characterizations calculated for each summary. For example, the navigator module 112 can reduce the predetermined number of characterizations calculated by the fingerprint generator module 108 by adjusting a parameter used by the fingerprint generator module 108.

Figure 6:
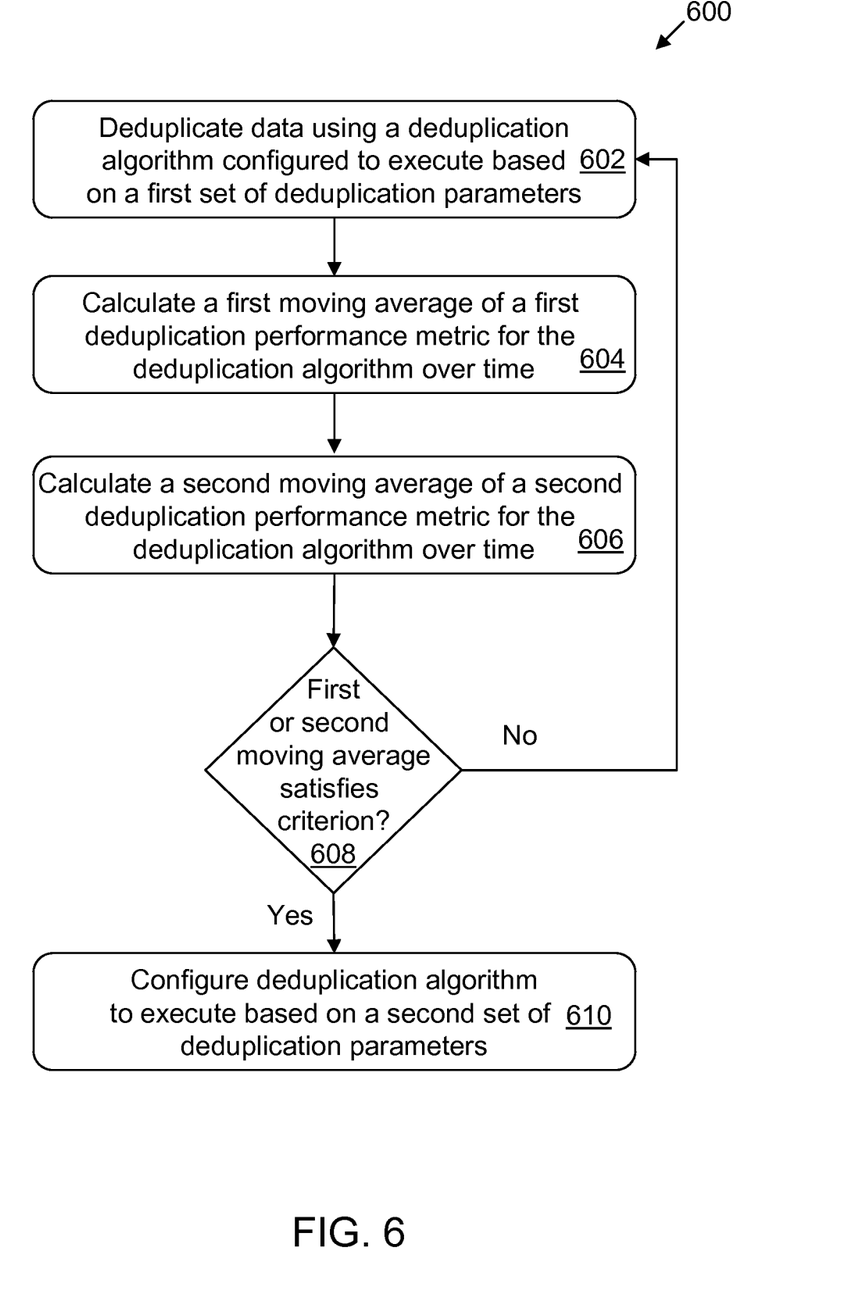
FIG. 6 is a diagram of an exemplary computerized method for dynamic deduplication.

The backup data storage system 102 can adjust the detection and/or deduplication process to compensate for the type of data being backed up based on parameters associated with the deduplication process. FIG. 6 is a diagram of an exemplary computerized method 600 for dynamic deduplication. At step 602, the storage system module 104 deduplicates data (e.g., via the delta differencer module 110) using a deduplication algorithm that deduplicates the data based on a first set of deduplication parameters. At step 604, the storage system module 104 (e.g., via an analysis module, not shown) calculates a first moving average of a first deduplication performance metric for the algorithm over a time period. At step 606, the storage system module 104 calculates a second moving average of a second deduplication performance metric for the algorithm over the time period. At step 608, the storage system module 104 determines whether the first moving average satisfies a first criterion and/or the second moving average satisfies a second criterion. If the storage system module 104 determines either the first moving average satisfies the first criterion or the second moving average satisfies the second criterion, the storage system module 104 reconfigures the deduplication algorithm based on a second set of parameters to deduplicate data. If the storage system module 104 determines that neither the first moving average satisfies the first criterion nor the second moving average satisfies the second criterion, the method 400 proceeds back to step 602.

Referring to steps 604 and 606, the performance metrics can include any performance metric for the deduplication algorithm. In some embodiments, the performance metrics include a deduplication ratio and a deduplication speed. For example, at step 602 the storage system module 104 can calculate a moving average for the deduplication ratio of the deduplication algorithm. For example, the deduplication ratio can be a ratio that is indicative of the amount of data that the deduplication algorithm deduplicates compared to the amount of data that the deduplication algorithm does not deduplicate. The deduplication ratio can be calculated by, for example, dividing the amount of data that was deduplicated by the amount of data that was not deduplicated. Advantageously, the deduplication ratio can provide an indication of how well the deduplication algorithm is deduplicating incoming data sets. The deduplication ratio can provide an indication of whether parameters for the deduplication algorithm should be adjusted to try and improve the deduplication ratio. At step 604, the storage system module 104 can calculate a moving average for the deduplication speed of the deduplication algorithm. The deduplication speed can provide an indication of how long the deduplication algorithm takes to process an individual data set. For example, the deduplication speed can be indicative of how many MB/sec of data the deduplication algorithm processes (e.g., 30 MB/sec). Advantageously, the deduplication speed can provide an indication of how well the deduplication algorithm is deduplicating the data (e.g., the longer it takes the deduplication algorithm to process data sets, the better the indication that the deduplication algorithm is performing poorly).

In some embodiments, the storage system module 104 calculates the moving average by calculating an exponentially weighted moving average (EWMA). An exemplary EWMA formula is provided below as equation 1:

$$R_t = \alpha D_t + (1-\alpha) R_{t-1},$$ Equation 1 where:
$R_t$ = the EWMA value at the current time t;

$R_{t-1}$ = is the EWMA value at time t−1 (e.g., the previous update of the EWMA computation);
$\alpha$ = a variable which determines the weight to accord previous EWMA values (0<$\alpha$<1); and
$D_t$ = the performance metric at time t.

As shown by Equation 1, the EWMA value $R_t$ at time t is calculated based on the performance metric $D_t$ at a current time t, the EWMA for the performance metric at a previous time t−1 ($R_{t-1}$), and an update parameter $\alpha$. Advantageously, EWMA provides a method to calculate a relative weighting between the current measurement and its historical trend over time, without allowing the calculation to be unduly influenced by outliers. By configuring the EWMA calculation accordingly, the EWMA calculation can be weighted against the instantaneous rate (e.g., which can make the calculation robust to uncharacteristically high and low instantaneous calculations). Similarly, for example, if the EWMA calculation begins with an uncharacteristically high or low calculation, the EWMA factors in the previous value $R_{t-1}$ based on $\alpha$, and can therefore be configured to not be unduly influenced by the initial outlier value(s). For example, although one high value is initially recorded, the EWMA can detect subsequent poor performance without being skewed by the initial high value. In some embodiments, Equation 1 can be modified. For example, rather than calculating Equation 1 based on time, other criterions can be used (e.g., amount of data).

Referring to steps 608, the storage system module 104 can compare the moving averages for the deduplication performance metrics against associated criterions to determine whether or not the moving averages trigger a change condition for the deduplication algorithm. For example, if the storage system module 104 determines that an EWMA deduplication speed is below 20 MB/sec, the storage system module can adjust the parameters of the deduplication algorithm. The storage system module 104 can monitor an EWMA deduplication ratio to determine whether or not to further adjust the parameters of the deduplication algorithm. For example, if the storage system module 104 determines the EWMA deduplication speed is satisfactory, the storage system module 104 can analyze the EWMA deduplication ratio. If the storage system module 104 determines the EWMA deduplication ratio is below a first threshold (e.g., below 5:1, such as being equal to 2:1), the storage system module 104 can adjust the parameters of the deduplication algorithm (e.g., to revert back to the original deduplication parameters being used before modifying the parameters based on the EWMA deduplication speed). If the storage system module 104 determines the EWMA deduplication ratio is below a second threshold (e.g., below 2:1, such as being equal to 1.5:1), the deduplication ratio can further adjust the parameters of the deduplication algorithm (e.g., to be more aggressive).

Referring to step 610, the deduplication algorithm can have two or more operating modes, where each mode is configured to process a particular type of data. For example, a first operating mode can be used to process data that does not exhibit poor locality, and a second operating mode can be used to process data that exhibits poor locality. The storage system module 104 can switch between the operating modes by configuring parameters of the deduplication algorithm (e.g., a first set of parameters can configure the deduplication algorithm to operate according to a first mode, a second set of parameters can configure the deduplication algorithm to operate according to a second mode etc.).

For example, the storage system module 104 can determine, based on the EWMAs, that a particular operating mode of the deduplication algorithm is not sufficiently processing data sets (e.g., the deduplication algorithm is taking too long to process data sets, the deduplication algorithm has low deduplication ratios, etc.). For example, the storage system module 104 can configure the deduplication algorithm to process normal data sets by configuring the deduplication algorithm according to a first set of parameters. As the deduplication algorithm processes the data sets, the storage system module 104 can calculate EWMAs for performance metrics associated with the deduplication algorithm (e.g., deduplication ratio and speed). The storage system module 104 determines, based on the EWMAs for the associated performance metrics, that the deduplication algorithm is not sufficiently processing the data sets. For example, the data sets can include difficult data to process (e.g., multiplexed data or multistriped data), but the deduplication algorithm is not configured to process the difficult data. For example, the difficult data can include multiplexed data with extremely poor locality or redundant data distributed wildly through the data stream. The storage system module 104 can reconfigure the deduplication algorithm to operate according to a second mode to process the multiplexed data by configuring the deduplication algorithm according to a second set of parameters.

The storage system module 104 can switch between different sets of parameters by adjusting one or more of the deduplication algorithm parameters. For example, the storage system module 104 can change a fingerprint match parameter in the first set of parameters from a first value to a second value. For example, in a first operating mode (e.g., for normal data), the deduplication algorithm will consider a fingerprint match to be valid if it matches less than 2000 places in the target data set (e.g., in data set one 202). The storage system module 104 can switch to a second operating mode with a smaller match limit (e.g., a fingerprint that matches in 2000 place would be considered useless).

As another example, the storage system module 104 can adjust a parameter indicative of a number of characteristic matches (e.g., hash pair matches) required for two summaries (e.g., fingerprints) to match. For example, the storage system module 104 can set the parameter to "1" (which is indicative of requiring one characteristic match to identify a summary match), "2" (which is indicative of requiring two characteristic matches to identify a summary match), and so on.

As another example, the storage system module 104 can adjust a parameter indicative of how to calculate a weighting function for characteristic matches. For example, the storage system module 104 can calculate a weight for a characteristic based on how many other characteristics it matched with. For example, the storage system module 104 can de-weight a characteristic that matched 1,999 other characteristics (since the characteristic may not be indicative of a strong match with any characteristic), while not de-weighting a characteristic that only matched one other characteristic (e.g., a unique match). The storage system module 104 could modify the weight function (e.g., to have a higher/lower threshold before de-weighting a characteristic).

As another example, the storage system module 104 can adjust a parameter indicative of what fraction of a summary (e.g., fingerprint) needs to be deduplicated in order to delete that summary from consideration. The storage system module 104 can adjust the parameter to change the threshold used to determine whether or not to delete the summary from consideration.

The storage system module 104 can continue to calculate the moving averages (e.g., by repeatedly executing method 600). Advantageously, if the data sets change over time, the storage system module 104 can continue to switch between operating modes of the deduplication algorithm to best configure the algorithm to process the incoming data sets. For example, the storage system module 104 may switch from a first operating mode to a second operating mode, but then after some time the storage system module 104 may switch back to the first operating mode (e.g., based on the moving averages of the performance metrics). Advantageously, the storage system module 104 can configure various parameters of the storage system 102 during operation based on the type of data sets being processed. The storage system 102 can recognize difficulties with processing data sets and adjust itself (e.g., by adjusting parameters) to maximize processing of the data sets (e.g., to maximize speed, to maximize efficiency, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for storing data comprising:
processing, by a computing device, data using a deduplication process that deduplicates the data based on a first set of parameters;
calculating, by the computing device, a first moving average of a first deduplication performance metric for the deduplication process over a time period;
calculating, by the computing device, a second moving average of a second deduplication performance metric for the deduplication process over the time period, the second deduplication performance metric being different from the first deduplication performance metric;
determining, by the computing device, the first moving average satisfies a first criterion, the second moving average satisfies a second criterion, or both; and
reconfiguring, by the computing device, the deduplication process based on a second set of parameters to deduplicate data.

2. The method of claim 1 wherein:
calculating the first moving average comprises calculating a first exponentially weighted moving average of the first performance metric over the time period; and
calculating the second moving average comprises calculating a second exponentially weighted moving average of the second performance metric over the time period.

3. The method of claim 2 wherein calculating the first exponentially weighted moving average comprises calculating the first exponentially weighted moving average based on:
a first performance metric value at a current time;
an exponentially weighted moving average for the first performance metric at a previous time; and
an update parameter.

4. The method of claim 2 wherein calculating the second exponentially weighted moving average comprises calculating the second exponentially weighted moving average based on:
a second performance metric value at a current time;
an exponentially weighted moving average for the second performance metric at a previous time; and
an update parameter.

5. The method of claim 1 wherein the first set of parameters causes the deduplication process to deduplicate the data based on a first operating mode, and wherein the second set of parameters causes the deduplication process to deduplicate the data based on a second operating mode.

6. The method of claim 1 wherein reconfiguring comprises generating the second set of parameters by adjusting one or more parameters in the first set of parameters.

7. The method of claim 6 wherein adjusting comprises changing a fingerprint match parameter in the first set of parameters from a first value to a second value.

8. The method of claim 1 comprising:
calculating a third moving average of the first deduplication performance metric over a second time period;
calculating a fourth moving average of the second deduplication performance metric over the second time period;
determining the third moving average satisfies the first criterion, the fourth moving average satisfies the second criterion, or both; and
reconfiguring the deduplication process based on the first set of parameters to deduplicate data.

9. The method of claim 1 wherein the first performance metric is a deduplication speed metric for the deduplication process and the second performance metric is a deduplication ratio metric for the deduplication process.

10. A computer program product, tangibly embodied in a non-transitory computer readable medium, the computer program product including instructions being configured to cause a data processing apparatus to:
process data using a deduplication process that deduplicates the data based on a first set of parameters;
calculate a first moving average of a first deduplication performance metric for the deduplication process over a time period;
calculate a second moving average of a second deduplication performance metric for the deduplication process over the time period, the second deduplication performance metric being different from the first deduplication performance metric;
determine the first moving average satisfies a first criterion, the second moving average satisfies a second criterion, or both; and
reconfigure the deduplication process based on a second set of parameters to deduplicate data.

11. The computer program product of claim 10, wherein the instructions are further configured to cause the data processing apparatus to:
calculate the first moving average as a first exponentially weighted moving average of the first performance metric over the time period; and
calculate the second moving average as a second exponentially weighted moving average of the second performance metric over the time period.

12. An apparatus comprising a processor and memory configured to:
process data using a deduplication process that deduplicates the data based on a first set of parameters;
calculate a first moving average of a first deduplication performance metric for the deduplication process over a time period;
calculate a second moving average of a second deduplication performance metric for the deduplication process over the time period, the second deduplication performance metric being different from the first deduplication performance metric;
determine the first moving average satisfies a first criterion, the second moving average satisfies a second criterion, or both; and
reconfigure the deduplication process based on a second set of parameters to deduplicate data.

13. The apparatus of claim 12, wherein the apparatus is further configured to:
calculate the first moving average as a first exponentially weighted moving average of the first performance metric over the time period; and
calculate the second moving average as a second exponentially weighted moving average of the second performance metric over the time period.

14. The apparatus of claim 13, wherein the apparatus is further configured to calculate the first exponentially weighted moving average based on:
a first performance metric value at a current time;
an exponentially weighted moving average for the first performance metric at a previous time; and
an update parameter.

15. The apparatus of claim 13, wherein the apparatus is further configured to calculate the second exponentially weighted moving average based on:
a second performance metric value at a current time;
an exponentially weighted moving average for the second performance metric at a previous time; and
an update parameter.

16. The apparatus of claim 12, wherein the first set of parameters causes the apparatus to deduplicate the data based on a first operating mode, and wherein the second set of parameters causes the apparatus to deduplicate the data based on a second operating mode.

17. The apparatus of claim 12 wherein the apparatus is further configured to reconfigure the deduplication process by adjusting one or more parameters in the first set of parameters to generate the second set of parameters.

18. The apparatus of claim 17 wherein the apparatus is further configured to adjust the one or more parameters by changing a fingerprint match parameter in the first set of parameters from a first value to a second value.

19. The apparatus of claim 12 wherein the apparatus is further configured to:
calculate a third moving average of the first deduplication performance metric over a second time period;
calculate a fourth moving average of the second deduplication performance metric over the second time period;
determine the third moving average satisfies the first criterion, the fourth moving average satisfies the second criterion, or both; and
reconfigure the deduplication process based on the first set of parameters to deduplicate data.

20. The apparatus of claim 12 wherein the first performance metric is a deduplication speed metric for the deduplication process and the second performance metric is a deduplication ratio metric for the deduplication process.

* * * * *